US005259152A

United States Patent [19]
Taylor

[11] Patent Number: 5,259,152
[45] Date of Patent: Nov. 9, 1993

[54] MOUSETRAP

[76] Inventor: Janice D. Taylor, 11923 Bader, Balch Springs, Tex. 75180

[21] Appl. No.: 819,076

[22] Filed: Jan. 10, 1992

[51] Int. Cl.$^5$ .............................. A01M 23/30
[52] U.S. Cl. ............................................. 43/81
[58] Field of Search .................. 43/81, 82, 81.5, 83, 43/92, 93, 94, 87

[56] References Cited

U.S. PATENT DOCUMENTS

| | | | |
|---|---|---|---|
| 1,930,886 | 10/1933 | Scott | 43/81 |
| 2,222,653 | 11/1940 | Chambless et al. | 43/94 |
| 2,524,324 | 10/1950 | Martin | 43/81 |
| 2,581,628 | 1/1952 | Burwell | 43/81 |
| 3,430,380 | 3/1969 | Poff | 43/81 |
| 3,757,456 | 9/1973 | Lucci | 43/81 |
| 4,030,230 | 6/1977 | Souga | 43/81 |

FOREIGN PATENT DOCUMENTS 138408 12/1952 Sweden ................... 43/81

Primary Examiner—Richard K. Seidel
Assistant Examiner—Chuck Y. Mah
Attorney, Agent, or Firm—Daniel V. Thompson

[57] ABSTRACT

A trap for target animal includes a trigger for shifting the trap from a set state to an actuated state. The trigger includes first and second trigger elements and a biasing spring biasing the first trigger element for movement relative the second trigger element to an actuation position where the trap shifts to the actuated state. The trigger elements are immobilized by a consumable bait link. The bait link opposes force applied by the biasing spring acting on the first trigger element, such that the first trigger element moves relative the second trigger element and shifts the trap to the actuated state upon removal or at least partial consumption of the bait link.

7 Claims, 2 Drawing Sheets

＃ MOUSETRAP

TECHNICAL FIELD

This application relates to animal traps, and more particularly to an animal trap having a trigger for shifting the trap from a set state to an actuated state.

BACKGROUND ART

Conventional (and most widely used) traps to catch mice, rats and the like use a spring-loaded, pivoting kill bar. The conventional trap has a trigger that is actuated by a bait holder being dislodged by the feeding of an animal on the bait. The conventional triggering mechanism is difficult to set and is easy to accidently trip. Many times the trap is not actuated upon feeding or removal of the bait from the bait holder due to insufficient sensitivity, and the target animal "steals" the bait. Most traps are sufficiently sensitive, however, that baiting or moving the trap accidently triggers the trap, sometimes catching the fingers or hand of the operator in the process.

Thus, there presently exists the need for an animal trap having a relatively accident proof yet sufficiently sensitive triggering mechanism.

SUMMARY OF THE INVENTION

The present invention provides trap for a target animal that includes a trigger means for shifting the trap from a set state to an actuated state. The trigger means includes two trigger elements that are biased for movements away from each other, with the trigger elements being immobilized by a bait link. The trigger elements are released for relative movements upon removal or partial consumption of a bait link.

BRIEF DESCRIPTION OF THE DRAWINGS

A more complete understanding of the invention and its advantages will be apparent from the Detailed Description taken in conjunction with the accompanying Drawings, in which.

DETAILED DESCRIPTION OF THE PREFERRED EMBODIMENT

Figure 1:
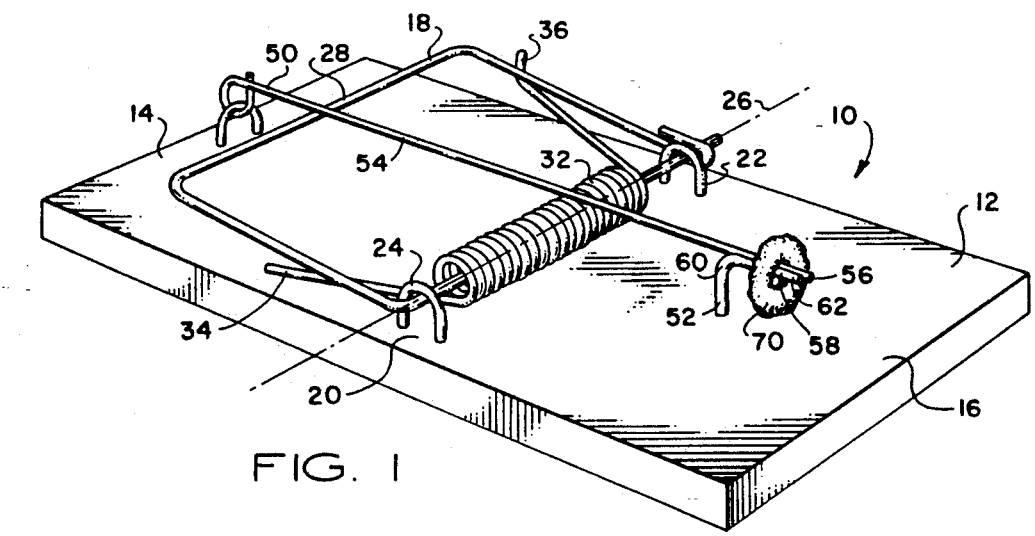
FIG. 1 is a perspective view of a trap constructed in accordance with the invention.
Figure 2:
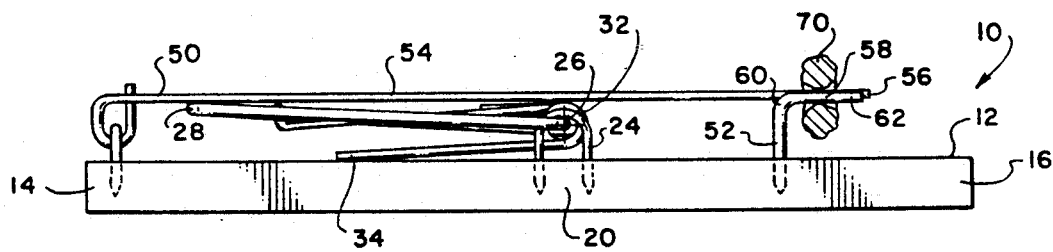
FIG. 2 is a side view of the trap of FIG. 1.
Figure 3:
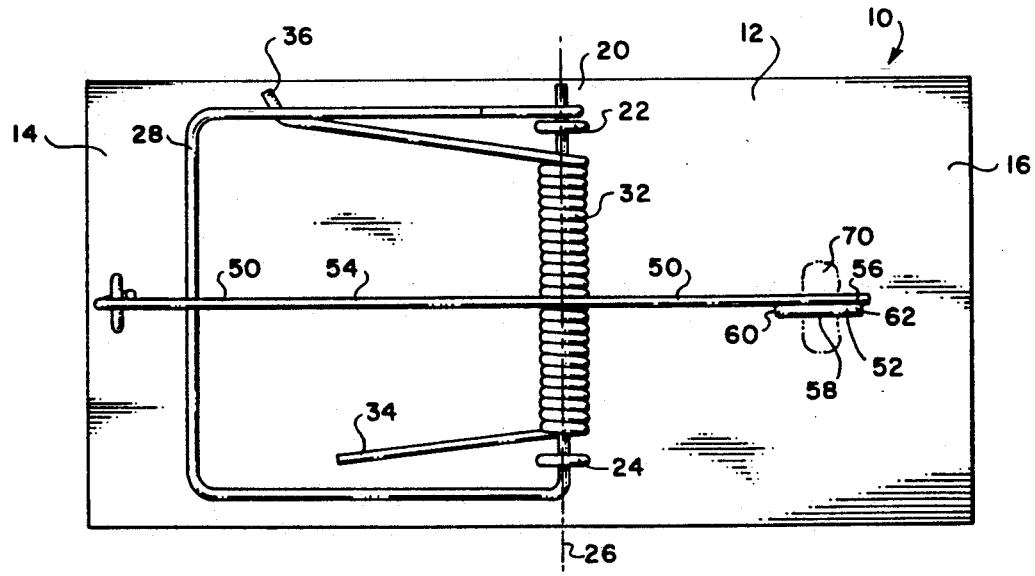
FIG. 3 is an overhead view of the trap.
Figure 5:
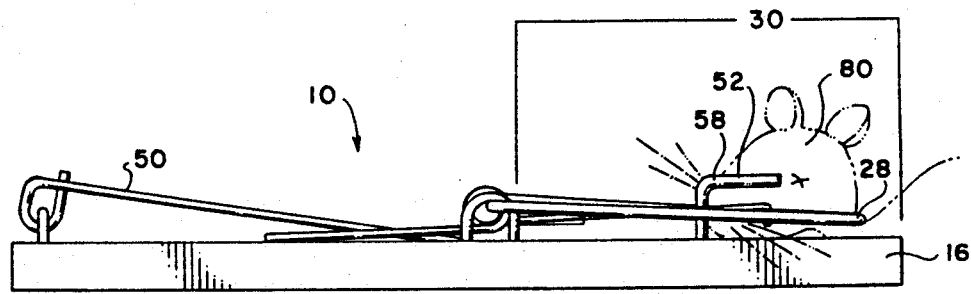
FIG. 5 is a view of the trap in the actuated state.

Referring initially to FIGS. 1-3, where like numerals indicate like and corresponding elements, a trap 10 includes an elongated base plate 12 having opposite ends 14 and 16. A U-shaped kill bar 18 is pivotally connected to base plate 12 at a medial location 20 by staples 22 and 24. Kill bar 18 is adapted for pivoting movements about axis 26 transverse to the long dimension of base plate 12. Kill bar 18 has a center portion 28 located adjacent base plate end 14 when the trap is in a set state, as illustrated in FIGS. 1-3. Referring to FIG. 5, center portion 28 is located in a kill zone 31 adjacent base plate end 16 when the trap is in an actuated state.

Torsion spring 32 has two ends 34 and 36. End 36 is disposed to act upon kill bar 18, and end 3 is disposed to act upon base plate 12. Spring 32 biases kill bar center portion 28 toward the kill zone 30, as best shown in FIG. 4.

A key feature of the invention is the trigger means for shifting the trap from the set state (FIGS. 1-3) to the actuated state (FIG. 5). The trigger means includes a first trigger element 50 and a second trigger element 52. First trigger element 50 preferably is a wire arm 54 pivotally connected to the base plate at end 14 opposite kill zone 30. Arm 54 extends longitudinally over and beyond the kill bar axis 26 to an end 56. Second trigger element 52 preferably is a wire finger 58 extending upwardly from the base plate kill zone 30 to a bend 60 and then extending longitudinally away from axis 26 to an end 62. The arm end 56 and finger end 62 preferably are located in the kill zone and in proximity to each other when the trap is in the set state, as shown in FIGS. 1-3. Arm 54 and finger 58 are encircled by an apertured, consumable, bait link 70 through which the arm and finger ends 56, 62 have been inserted.

Figure 4:
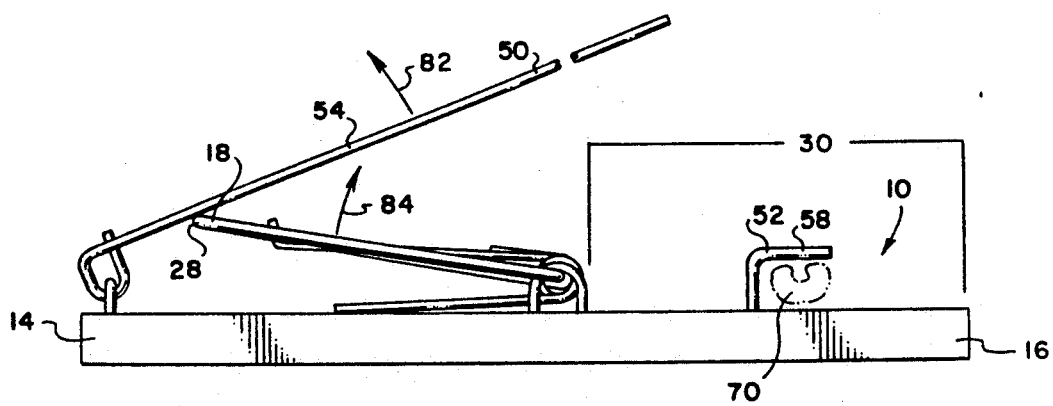
FIG. 4 is a side view of the trap being shifted from the set state to the actuated state.

In operation, spring 32 is a biasing means biasing the first trigger element 50 for movement relative the second trigger element 52 to an actuation position, shown in FIG. 4, where the trap shifts to the actuated state. Bait link 70 is an integral part of the trigger means, physically immobilizing the trigger elements until removal or partial consumption. The physical integration of the bait into the mechanism provides substantial advantages of this invention over prior trap.

Specifically, the bait link 70 is preferably tensioned by the biasing means acting on the first trigger element 50, such that the first trigger element 50 moves relative the second trigger element 52, as shown in FIG. 4, and shifts the trap to the actuated state shown in FIG. 5 upon removal, or at least partial consumption, of the bait link 70. In the preferred embodiment, the spring 32 biases the center portion 28 of the kill bar 18 to act upon the wire arm 54. Upon at least partial consumption of bait link 70, as shown in FIG. 4, kill bar center portion 28 is released for movement into the kill zone 30, and the trap shifts to the actuated state to trap target animal 80 (FIG. 5). Removal of the bait link 70 has the same effect. Bait link 70 is tensioned by the kill bar center portion 28 acting on arm 54 and biased by spring 32, such that arm 54 moves in the direction illustrated by arrow 82 (FIG. 4) relative ringer 58 to release the kill bar center portion 28. Kill bar is then biased and moved in the direction illustrated by arrow 84 (FIG. 4).

Figure 6:
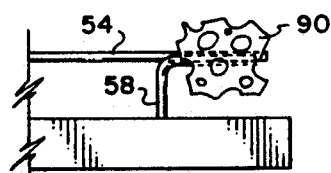
FIG. 6 is a partial side view of an alternate bait link.
Figure 7:
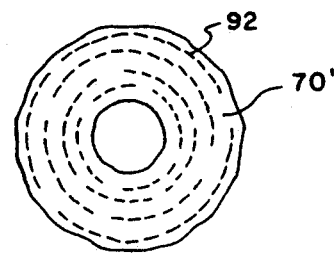
FIG. 7 illustrates yet another alternate link.
Figure 8:
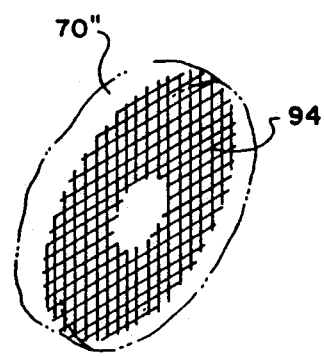
FIG. 8 illustrates still another alternate form of bait link.

In the preferred embodiment, bait link 70 is a substantially torus-shaped, consumable material, commonly sold as domestic cat food. Such bait link material is readily available, inexpensive, non-perishable and extremely attractive to rodents. Alternatively, as shown in FIG. 6, a portion of hard cheese 90 can be "speared" by arm 54 and finger 58 to the equivalent effect. FIG. 7 illustrates a toroid bait link 70' having reinforcing fibers 92 to increase the strength of the bait when used with larger traps having stronger biasing means. Finally, bait link 70" (FIG. 8) is reinforced by a mesh 94 for even further enhanced strength. Enhanced strength bait links may be designed to be reusable, and not consumable, relying on removal rather than consumption of the bait link to actuate the trap. It will be appreciated by those skilled in the art that the strength and consumability of the bait link can be matched to the power of the biasing means and the relative positioning of the triggering elements upon reasonable experimentation.

It will also be appreciated that an equivalent bait link may be held in compression by the trigger elements rather than being tensioned by them as illustrated. In a compression type trigger means, the bait link immobilizes the trigger elements by blocking relative movement until the bait link is removed or consumed. The trigger means is equally adapted to traps that capture animals for subsequent release and traps that kill animals.

While the present invention has been described with reference to illustrated preferred and alternate embodiments, it will be appreciated by those skilled in the art that various modifications and equivalents are possible, and it is intended to encompass such equivalents by the scope of the appended claims.

I claim:

1. A trap for a target animal, comprising:
   trigger means for shifting the trap from a set state to an actuated state, the trigger means including first and second trigger elements;
   biasing means biasing the first trigger element for movement relative the second trigger element to an actuation position where the trap shifts to the actuated state; a bait link;
   the trigger elements immobilized by said bait link, the bait link opposing force applied by the biasing means acting on the first tidier element, such that the fist trigger element moves relative the second trigger element and shifts the trap to the actuated state upon removal or at least partial consumption of the bait link by the target animal;
   the first trigger element being an arm having an end and the second trigger element being a finger having an end, the arm end and finger end being located inclose proximity to each other when the trap is in the set state;
   the arm and finger formed of wire; and
   the arm and finger encircled by said bait link into which the arm and finger ends have been inserted.

2. The trap of claim 1 where the bait link is put in tension by the biasing means.

3. The trap of claim 2 where the bait link is apertured.

4. The trap of claim 3 wherein the bait link is substantially a toroid.

5. The trap of claim 1 where the arm is pivotally connected to a base plate at an end opposite a kill zone and extends longitudinally over and beyond a kill bar axis to the arm end, and the second trigger element extends upwardly from the kill zone to a bend and then extends longitudinally away from the axis to the finger end.

6. The trap of claim 5 with the bait link being tensioned by a kill bar center portion acting on the arm and biased by a spring, such that the arm moves relative the finger to release the kill bar center portion and thereby shifts the trap to the actuated state when the bait link is removed or at least partially consumed.

7. A trap for a target animal, comprising:
   an elongated base plate having opposite ends;
   a U-shaped kill bar pivotally connected to the base plate at a medial location for pivoting movements about an axis transverse to a long dimension of the base plate, the kill bar having a center portion being located adjacent one of the base plate ends when the trap is in a set state and located in a kill zone adjacent the other base plate end when the trap is in an actuated state;
   a torsion spring having two ends, with one end disposed to act upon the kill bar and the other end disposed to act upon the base plate, the spring biasing the kill bar center portion toward the kill zone;
   trigger means for shifting the trap from the set state to the actuated state, the trigger means including first and second trigger elements;
   the spring biasing the center portion of the kill bar to act upon the first trigger element for movement relative the second trigger element to an actuation position, where the kill bar center portion is released for movement into the kill zone and the trap shifts to the actuated state; and
   the first trigger element being a wire arm pivotally connected to the base plate at the end opposite the kill zone and extending longitudinally over and beyond the kill bar axis to an end, the second trigger element being a wire finger extending upwardly from the base plate kill zone to a bend and then extending longitudinally away from the axis to an end, the arm end and finger end being located in close proximity to each other when the trap is in the set state; and a substantially toroid, removable, consumable bait link;
   the arm and finger encircled by said bait link into which the arm and finger ends have been inserted, the bait link being tensioned by the kill bar center portion acting on the arm and biased by the spring, such that the arm moves relative the finger to release the kill bar center portion and thereby shifts the trap to the actuated state upon removal or at least partial consumption of the consumable bait link by the target animal.

* * * * *

UNITED STATES PATENT AND TRADEMARK OFFICE
CERTIFICATE OF CORRECTION

PATENT NO.    : 5,259,152

DATED         : November 9, 1993

INVENTOR(S) : Virgil T. Calfee

It is certified that error appears in the above-identified patent and that said Letters Patent is hereby corrected as shown below:

On title page, item [19] "Taylor" should read --Calfee--;
                item [76] Inventor: should read
--Virgil T. Calfee, P.O. Box 614, Milford, Texas   76670--;

Signed and Sealed this

Third Day of May, 1994

Attest:

BRUCE LEHMAN

*Attesting Officer*    *Commissioner of Patents and Trademarks*